*J. W. Carhart,*
*Rotary Steam Valve.*
N° 45,225.   Patented Nov. 29, 1864.
Fig. 1.
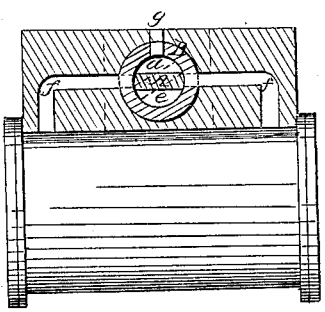
Fig. 2.
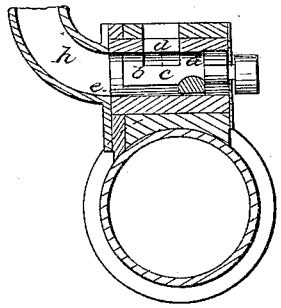
Fig. 4.
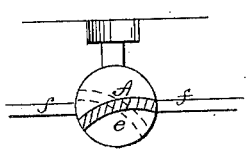
Fig. 5.   Fig. 3.   Fig. 7.
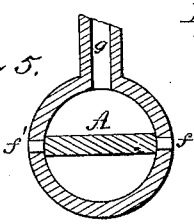 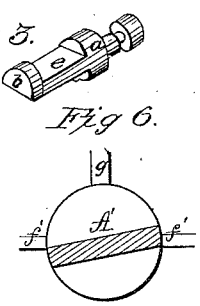 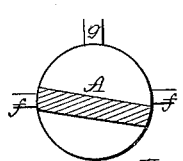
Fig. 6.
Witnesses.
C. D. Smith
J. Schattin
Inventor
J. W. Carhart
By Munn & Co
Attorneys

UNITED STATES PATENT OFFICE.

J. W. CARHART, OF COHOES, NEW YORK.

IMPROVEMENT IN OSCILLATING VALVES.

Specification forming part of Letters Patent No. 45,225, dated November 29, 1864.

*To all whom it may concern:*

Be it known that I, Rev. J. W. CARHART, of Cohoes, in the county of Albany and State of New York, have invented a new and Improved Oscillating Valve; and I do hereby declare that the following is a full, clear, and exact description thereof, which will enable those skilled in the art to make and use the same, reference being had to the accompanying drawings, forming part of this specification, in which—

Figure 1 represents a transverse vertical section of my valve, showing its position in relation to the ports. Fig. 2 is a longitudinal section of the same. Fig. 3 is a detached perspective view of the plug. Fig. 4 represents a transverse vertical section of the valve, showing the cut-off. Figs. 5, 6, and 7 are diagrams illustrating the various positions of the valve.

Similar letters of reference indicate corresponding parts.

This invention consists in the use of a plug or valve with one circular and one semicircular end, the two ends being connected by a flat abutment in such a manner that when the plug is fitted into a corresponding socket its circular end closes the socket all round; but its semicircular end closes the socket only half-way, giving access to the steam to that compartment of the socket below the abutment, and by imparting to this plug an oscillating motion the steam can be changed, throwing the ports alternately in communication with the steam pipe and with the exhaust-pipe.

A represents a plug made of metal or any other suitable material. One end, $a$, of this plug is circular, and its other end, $b$, is semicircular, as clearly shown in Fig. 3, and the two ends are connected by a flat abutment, $c$. This plug is fitted in a suitable socket, B, as clearly shown in Fig. 2, so that the end $a$ fits the socket all round, and the abutment $c$ divides the same in two compartments $d$ $e$, one of which is closed by the semicircular end $b$, whereas the other is open and free to receive steam. The socket B communicates by channels $f f'$ with the steam-ports of a cylinder, and a channel, $g$, leads from the same to the exhaust-pipe, as shown in Fig. 1, and steam is admitted to it through the pipe, $h$ Fig. 2. When the valve is in its central position, it closes the ports $f f'$, (see Fig. 1,) and the steam entering through the pipe $h$ is confined to the compartment $e$; but if the valve is brought in the position shown in red outlines in Fig. 1 the compartment $e$ communicates with the steam-channel $f'$, and the channel $f$ is brought in communication with the exhaust-pipe. The steam-cylinder takes steam at the port $f'$, and it exhausts through the port $f$. By reversing the valve the steam is changed, and if a regular oscillating motion is imparted to the valve the regular action of the steam-engine is produced.

This valve is very easily fitted. It is made in the exact form of the plug of an ordinary faucet with such parts removed as shown. It is perfectly balanced, so that it works equally well under pressure as it does in the open atmosphere. It can easily be kept tight, and it can be applied to steam-engines of any desired description.

A' represents the form of the valve when a cut-off is desired. At the point of cut-off the valve stands as represented in Fig. 4, closing the port $f'$, but leaving the steam free to exhaust through the port $f$. When the piston reaches the end of the stroke, another movement of the valve is made, bringing it in the position represented by the red outline, when the change is made, and the steam is admitted to the port $f$ and exhausts through the port $f'$.

I claim as new and desire to secure by Letters Patent—

A valve with a circular end, $a$, semicircular end $b$, and abutment $c$, of such form as to effect a cut-off, and fitted into a socket, B, to operate substantially as and for the purpose herein shown and described.

J. W. CARHART.

Witnesses:
A. M. HARMON,
S. R. ANDRES.